United States Patent [19]
Fitzpatrick

[11] 3,719,202
[45] March 6, 1973

[54] ANGLE VALVE
[75] Inventor: James Fitzpatrick, Toronto, Ontario, Canada
[73] Assignee: Dyer and Miller Bros., Ltd., Weston, Ontario, Canada
[22] Filed: March 1, 1971
[21] Appl. No.: 119,683

[52] U.S. Cl. ................137/360, 248/90, 137/357.28
[51] Int. Cl. ..................................................F16l 5/00
[58] Field of Search ......................248/90, 91, 92, 93; 137/355.16, 355.28, 359, 360

[56] References Cited
UNITED STATES PATENTS

| | | | |
|---|---|---|---|
| 3,091,251 | 5/1963 | Hughey | 137/355.28 |
| 838,208 | 12/1906 | Nuhring | 248/90 |
| 2,373,253 | 4/1945 | Martin | 285/220 |
| 2,634,071 | 4/1953 | Lund | 248/92 |

*Primary Examiner*—Henry T. Klinksiek
*Attorney*—Douglas S. Johnson

[57] ABSTRACT

The outlet part of an angle valve has an internal thread to receive an externally threaded adapter which in turn receives the fire hose connector.

1 Claim, 4 Drawing Figures

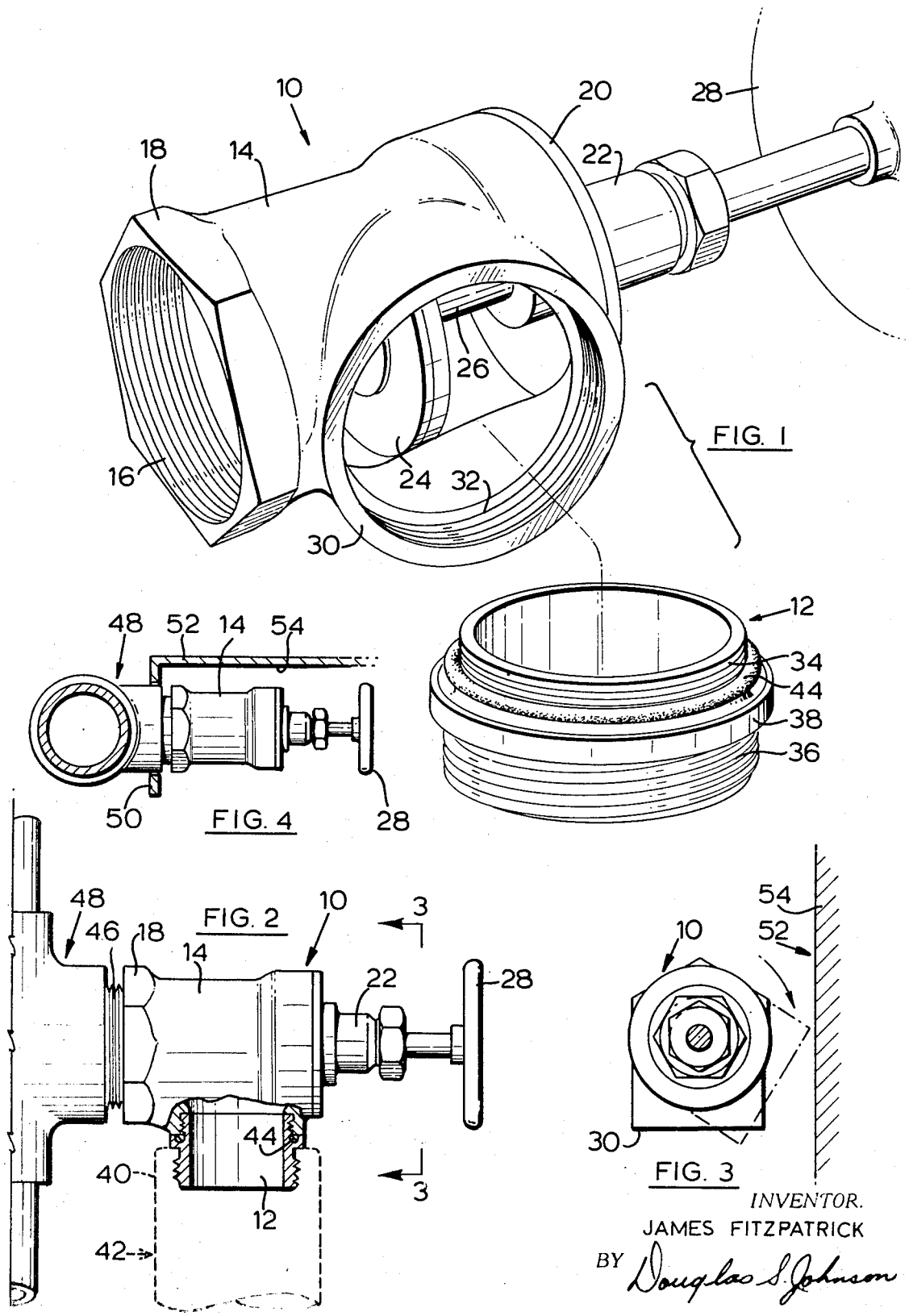

ANGLE VALVE

FIELD OF INVENTION

This invention relates to fire protection equipment and has particular relation to the provision of a connection for a fire hose to angle valves contained in fire hose cabinets installed in the walls of corridors in buildings.

PRIOR ART

It is the practice to provide fire hose cabinets with glass fronts at each floor level in a building, which cabinets are recessed in the wall. Each cabinet is positioned adjacent a riser located in the wall, the riser being connected to the water main, and each cabinet contains a length of fire hose which is connected to an angle valve threaded on to the riser.

The angle valve used for this purpose is formed of a hollow body with an inlet port provided by an internally threaded sleeve which is screwed on to the riser; the external formation of the sleeve is in the form of a hexagon nut to permit the application of a spanner. The angle valve has an internal seating with a valve plate thereon which is movable through connection to a rod extending in a direction away from the sleeve, which rod is operable by an external hand wheel. The angle valve also has an outlet port which is positioned at the side, the outlet port being formed of an abutment which has a projecting terminal portion, the exterior surface of which is provided with a thread. The threaded terminal portion permits attachment of the collar of the fire hose and the threads on the terminal portion are relatively coarse to permit for rapid attachment.

At the lower floor levels of a building the pressure provided by the water main is sufficient for fire fighting purposes. However, at higher floor levels the water pressure has to be augmented by the pump in the fire engine and it is mandatory at the eighth floor level and upwards to have an angle valve in the cabinet which would provide for a connection for a fire hose brought in by the fire brigade. When this valve is installed, the terminal portion of the abutment forming the exit port to the valve faces forward so as to permit easy and rapid attachment of the fire brigade hose.

Developments in the construction of buildings have resulted in thinner walls which have reduced the depth of the fire hose cabinets to as little as 6 in. if the glass front is to be flush with the adjacent wall surface. As a result, the riser has to be to the side of the cabinet and, as mentioned above, the angle valve, which extends laterally into the cabinet, is screwed on to the riser by rotation on an axis parallel to the back wall of the cabinet. It will be obvious that the threaded terminal portion of the abutment forming the exit port is a limiting factor to the permissible shallowness of the cabinet since the end of the threaded abutment must clear the back of the cabinet during rotary movement of the valve on the riser. There is in turn a practical limit to the possible reduction in the length of the abutment forming the exit port because it must have a sufficient number of relatively coarse threads to make a rapid but water-tight connection with the threaded collar of the hose brought in by the fire brigade.

It is an object of the invention to enable the angle valve to be threaded on to a riser and provide for attachment of a hose brought in by the fire brigade where the cabinet depth is as little as 6 inch.

SUMMARY

The invention consists in eliminating the exterior threaded terminal portion of the abutment forming the exit port of the angle valve and providing an interior thread to the abutment in which is threaded an adapter after the angle valve has been threaded on to the riser.

DESCRIPTION OF THE DRAWINGS

The invention will now be described in relation to the accompanying drawings in which:

FIG. 1 is a perspective view of an angle valve and adapter constructed according to the preferred embodiments of the invention;

FIG. 2 is a side-elevational view of an angle valve and an adapter located in the cabinet with the brigade fire hose secured to the adapter shown in broken outline;

FIG. 3 is a section taken on the lines 3—3 of FIG. 2, depicting the rotary action of the angle valve on a riser and the need for the abutment forming the exit port to clear the back wall of the cabinet;

FIG. 4 is a sectional plan view of an angle valve and adapter constructed according to the invention and located in a fire hose cabinet.

DESCRIPTION OF THE PREFERRED EMBODIMENTS

With reference to FIG. 1, there is shown an angle valve, generally denoted by the numeral 10, and a cooperating adapter, generally denoted by the numeral 12. The angle valve 10 has a hollow body 14 which is open at one end to provide an internally threaded sleeve 16, the outer surface of which is raised as at 18 to form into a shape of a hexagon nut. The other end of the valve 10 is closed by a plate 20 which has an outwardly extending boss 22.

Internal to the valve 10 is a seating, not shown, which is adjacent to the innermost thread of the sleeve 16. A circular plate 24 is located in the valve 10, the plate 24 being secured to a threaded rod 26 which extends outward through the boss 22. The rod 26 terminates in a hand wheel 28, shown only in outline. The features so far described in the valve 10 are conventional.

The body 14 of the valve 10 is provided with a side exit port formed of a circular abutment 30, the interior of which is provided with threads 32. The abutment 30 extends from the valve 10 only to the extent to provide two or three threads 32.

The circular adapter 12 has a first series of threads 34 which are engageable with the threads 32 of the abutment 30. The adapter 12 also has another series of threads 36 which are spaced apart from the threads 34 by a flange 38. The threads 36 are relatively coarse and are intended to provide for rapid attachment to the collar 40 of a fire brigade hose 42, shown in dotted outline in FIG. 2. Adjacent to the threads 34 and bearing against the flange 38 is a rubber sealing ring 44.

As illustrated in FIGS. 2 and 4, the sleeve 16 of the valve 10 is screwed on to the threads 46 of the riser 48 which extends through the side wall 50 of the wall cabinet, generally denoted in FIG. 4 by the numeral 52. The hexagon configuration of the sleeve 16 permits the application of a spanner to provide the final tightening, at which point the valve 10, projecting laterally into the cabinet 52, has a threaded abutment 30 facing forward with respect to the back wall 54 of the cabinet 52.

FIG. 3 illustrates the advantage of the invention in which the abutment 30 constructed according to the invention allows the valve 10 in the limited depth of the cabinet 52 to clear the back wall 54. When the valve 10 is tightly screwed on to the riser 48 with the abutment 30 facing forward, the threads 34 on the adapter 12 are engaged with the threads 32 of the circular abutment 30. On tightening the adapter 12, the ring 44 bearing against the flange 38 forms a pressure seal. In the event that the angle valve 10 has to be used in conjunction with the pump of the fire engine, the coarse threads 36 provide for rapid attachment to the collar 40 of the fire brigade hose 42.

What is claimed is:

1. In combination a fire hose angle valve and an adapter therefor for connecting a fire hose to a riser and adapted to be used in a fire hose cabinet into which a riser is led at a point such that it is in closer proximity to the rear wall of the cabinet than the required length of valve to fire hose coupling, said valve having a cylindrical internally threaded inlet port for threaded connection to the riser leading to a cylindrical hollow body and a cylindrical boss extending laterally from said hollow body and having an outlet port therein, the diameters of said inlet and outlet ports and said hollow body being substantially about the same, valve means in said body and an operator therefor all disposed for retraction when in valve open position to provide unimpeded flow between said inlet and outlet ports, said cylindrical boss projecting laterally to an extent sufficient only to accommodate not more than about three relatively fine internal threads and substantially less than that required to accommodate a thread extent of relatively coarse threads sufficient to effect an adequate threaded connection to the normal relatively coarse threads of a fire hose; the arrangement being such that said valve is adapted to be threaded onto the riser while clearing the rear wall of the fire hose cabinet during rotation to install the valve, said cylindrical boss having not more than about three relatively fine internal threads formed therein, and said adapter comprises a cylindrical sleeve-like member having a relatively shorter externally threaded portion of relatively fine threads for threadably coupling said adapter to the internal threading of said boss, a relatively longer externally threaded portion of relatively coarse thread for threadably coupling said adapter to a fire hose, and a collar between said relatively shorter and longer adapter portions, and compressible sealing means adapted to be placed under coupling sealing compression between said boss and said shorter adapter portion on assembly of said adapter with said valve.

* * * * *